US012656136B2

(12) United States Patent
Lee

(10) Patent No.: US 12,656,136 B2
(45) Date of Patent: Jun. 16, 2026

(54) SYSTEM FOR CONTROLLING THE CHARGING STATE OF AN ELECTRIC VEHICLE AND A METHOD FOR CONTROLLING THE CHARGING STATE THEREOF

(71) Applicants: HYUNDAI MOTOR COMPANY, Seoul (KR); KIA CORPORATION, Seoul (KR)

(72) Inventor: Hye Joo Lee, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 284 days.

(21) Appl. No.: 18/235,412

(22) Filed: Aug. 18, 2023

(65) Prior Publication Data

US 2024/0060787 A1 Feb. 22, 2024

(30) Foreign Application Priority Data

Aug. 19, 2022 (KR) ........................ 10-2022-0104063

(51) Int. Cl.
*G01C 21/34* (2006.01)
*B60L 58/12* (2019.01)
*B60R 16/033* (2006.01)

(52) U.S. Cl.
CPC .......... *G01C 21/3469* (2013.01); *B60L 58/12* (2019.02); *B60R 16/033* (2013.01); *G01C 21/3492* (2013.01); *B60L 2240/545* (2013.01); *B60L 2240/68* (2013.01); *B60L 2240/70* (2013.01)

(58) Field of Classification Search
CPC ............................ G01C 21/3492; B60L 3/12
See application file for complete search history.

(56) References Cited

U.S. PATENT DOCUMENTS

| | | | |
|---|---|---|---|
| 2016/0040995 A1* | 2/2016 | Kano | ........................ G01L 7/00 701/123 |
| 2017/0098176 A1* | 4/2017 | Hirose | ................... G06Q 10/20 |
| 2020/0401200 A1* | 12/2020 | Varughese | ................ B60L 1/00 |

* cited by examiner

*Primary Examiner* — Todd Melton
*Assistant Examiner* — Vincent Feng
(74) *Attorney, Agent, or Firm* — Lempia Summerfield Katz LLC

(57) ABSTRACT

In an electric vehicle which drives at least one external device with power of a battery for driving an electric motor, an available power amount information is set based on the power of the battery. A usage information to at least one usage devices selected by a user among the at least one external device is provided from a server or a smart device, and the usage information is matched with a preset load power data. A usage device calculates the predicted power amount information on the usage device based on a matched use information and an available power amount information, and provides the predicted power amount information to the smart device. When information on a destination is inputted by a user, a plurality of driving routes capable of driving to the destination are set on the basis of the predicted power amount information.

20 Claims, 17 Drawing Sheets

SYSTEM FOR CONTROLLING THE CHARGING STATE OF AN ELECTRIC VEHICLE AND A METHOD FOR CONTROLLING THE CHARGING STATE THEREOF

CROSS-REFERENCE TO RELATED APPLICATION

The present application claims the benefit of and priority to Korean Patent Application No. 10-2022-0104063, filed on Aug. 19, 2022, the entire contents of which are incorporated herein by reference.

TECHNICAL FIELD

The present disclosure relates to a system for controlling the state of charge of an electric vehicle and a method for controlling the state of charge thereof, that can predict the time to reach a minimum charging amount.

BACKGROUND

As electric vehicles have become more popular, various functions using batteries or characteristics of electric vehicles are being developed or mass-produced.

Various functions using the battery of the electric vehicle include a utility mode, a vehicle to load (V2L), a V2G/V2H, and the like.

Utility mode is a function of using an electric device (e.g., multimedia, air conditioning, etc.) of an electric vehicle in a state in which the driving of the electric vehicle is stopped. V2L is a function of using a high voltage battery of the electric vehicle as a power supply source of an external power device. V2G/V2H is a function of exchanging power in conjunction with an external infrastructure.

In recent years, the power amount of an electric vehicle battery is increased due to a constant-speed battery, and the number of users who enjoy camping using an electric vehicle (e.g., installing a tent around an electric vehicle or connecting an electric vehicle to the tent) or camping staying in an interior of an electric vehicle is increasing.

Electric vehicles display the charging amount (kW) in real time with the introduction of Vehicle to Load (V2L) technology. However, it is difficult to estimate how much the real-time charging amount can be used and how much the effect on the battery is when an external power device is actually consumed.

In addition, it is difficult to intuitively check the consumption amount during camping although the electric vehicle can set the minimum power amount for driving by setting the minimum charging amount.

SUMMARY

Embodiments of the present disclosure provide a system for controlling the state of charge of an electric vehicle, and a method for controlling the state of charge thereof, capable of automatically recommending a minimum charging amount according to a destination, taking into consideration a usage of one or more built-in electric devices (e.g. an air conditioning device, a heater, or a multimedia device) and a usage of a V2L (Vehicle to Load) mode (for indoor or outdoor), and stably maximizing a V2L use time to increase the efficient usage of the battery.

The technical problems to be solved by the present disclosure are not limited to the above-mentioned technical problems, and other technical problems not mentioned should be clearly understood by those having ordinary skill in the art from the following description.

In an embodiment, a method for controlling a state of charge of a battery of an electric vehicle includes setting available power amount information based on a State of Charge (SOC) of the battery for supplying power to an electric motor for driving the electric vehicle. The method also includes receiving usage information of at least one external device selected by a user from a server or a smart device and matching the usage information to a preset load power data. The method further includes calculating predicted power amount information of the at least one external device based on a result of the matching and the available power amount information and providing the predicted power amount information to the smart device. The method additionally includes determining a plurality of driving routes possible to a destination input by the user based on the predicted power amount information.

In at least one embodiment of the present disclosure, determining the plurality of driving routes includes analyzing each of the plurality of driving routes based on navigation information and real-time traffic information provided from an external server, and determining one of the plurality of driving routes as a recommended route based on a result of the analyzing.

In at least one embodiment of the present disclosure, setting the available power amount information includes determining a power consumption characteristic value for the electric vehicle, determining a current external temperature for the electric vehicle, determining a temperature factor by matching the current external temperature to a predetermined temperature range, calculating the SOC of the battery by applying at least one of the power consumption characteristic value or the temperature factor, and calculating an available power amount value based on the SOC of the battery.

In at least one embodiment of the present disclosure, the available power amount information includes at least one of the SOC of the battery, the available power amount value, the power consumption characteristic value, or the temperature factor.

In at least one embodiment of the present disclosure, the usage information includes basic information about the at least one external device and a predicted time of use of the at least one external device.

In at least one embodiment of the present disclosure, calculating the SOC of the battery includes analyzing the predicted power amount information based on the result of the matching and the available power amount information, and predicting an estimated time to reach a minimum charging amount of the battery based on a result value of the analyzing of the predicted power amount information.

In at least one embodiment of the present disclosure, predicting the estimated time includes predicting an estimated SOC of the battery.

In at least one embodiment of the present disclosure, the minimum charging amount is set to be lower when the destination is a charging station.

In at least one embodiment of the present disclosure, matching the usage information includes, when the at least one external device is a new external device that has not been used, receiving information about the new external device from the server, and matching the information about the new external device to the preset load power data.

In at least one embodiment of the present disclosure, determining the recommended route includes predicting the minimum charging amount by calculating a power amount required to reach the destination in a most recently used vehicle setting mode.

In another embodiment, a system for controlling a state of charge (SOC) of a battery of an electric vehicle comprises a non-transitory computer-readable recording medium configured to store at least one computer program for performing operations for controlling the SOC. The system also includes a processor configured to execute the computer program to perform the operations. The operations include setting available power amount information based on an SOC of the battery for supplying power to an electric motor for driving the vehicle. The operations also include receiving usage information of at least one external device selected by a user from a server or a smart device and matching the usage information to a preset load power data. The operations further include calculating predicted power amount information of the at least one external device based on a result of the matching and the available power amount information and providing the predicted power amount information to the smart device. The operations additionally include determining a plurality of driving routes possible to a destination input by the user based on the predicted power amount information.

In at least one embodied system of the present disclosure, determining the plurality of driving routes includes analyzing each of the plurality of driving routes based on navigation information and real-time traffic information provided from an external server, and determining one of the plurality of driving routes as a recommended route based on a result of the analyzing.

In at least one embodied system of the present disclosure, setting the available power amount information includes determining a power consumption characteristic value for the electric vehicle, determining a current external temperature for the electric vehicle, determining a temperature factor by matching the current external temperature to a predetermined temperature range, calculating the SOC of the battery by applying at least one of the power consumption characteristic value or the temperature factor, and calculating an available power amount value based on the SOC of the battery.

In at least one embodied system of the present disclosure, the available power amount information includes at least one of the SOC of the battery, the available power amount value, the power consumption characteristic value, or the temperature factor.

In at least one embodied system of the present disclosure, the usage information includes basic information about the at least one external device and a predicted time of use of the at least one external device.

In at least one embodied system of the present disclosure, calculating the SOC of the battery includes analyzing the predicted power amount information based on the result of the matching and the available power amount information, and predicting an estimated time to reach a minimum charging amount of the battery based on a result value of the analyzing of the predicted power amount information.

In at least one embodied system of the present disclosure, predicting the estimated time includes predicting an estimated SOC of the battery.

In at least one embodied system of the present disclosure, the minimum charging amount is set to be lower when the destination is a charging station.

In at least one embodied system of the present disclosure, matching the usage information includes, when the at least one external device is a new external device that has not been used, receiving information about the new external device from the server, and matching the information about the new external device to the preset load power data.

In at least one embodied system of the present disclosure, determining the recommended route includes predicting the minimum charging amount by calculating a power amount required to reach the destination in a most recently used vehicle setting mode.

According to at least one embodiment of the present disclosure, the system for controlling the state of charge of an electric vehicle and the method for controlling the state of charge thereof can recommend the minimum amount of charge depending on the destination and stably increase the maximum V2L usage time, thereby efficiently increasing the use of the electric vehicle after the use of an electric equipment (air conditioning/heater/multimedia) or a (indoor/outdoor) V2L mode activity.

According to at least one embodiment of the present disclosure, the system for controlling the state of charge of an electric vehicle and a method for controlling the state of charge thereof can accurately predict the estimated time of arrival to the minimum amount of charge by calculating the predicted value of V2L consumption based on general consumption, actual power consumption, or the like of external power devices frequently used by users of the electronic equipment (air conditioning/heater/multimedia) and the V2L (indoor/outdoor).

According to at least one embodiment of the present disclosure, the system for controlling the state of charge of an electric vehicle and a method for controlling the state of charge thereof can efficiently use camping or other power by using an accurately predicting the minimum amount of charge and the estimated time of arrival to increase the usability of an external power device using a battery of the electric vehicle.

According to at least one embodiment of the present disclosure, the system for controlling the state of charge of an electric vehicle and a method for controlling the charge state of charge thereof can increase convenience of the use for V2L of the electric vehicle, and can resolve existing anxiety when using the battery of the electric vehicle.

The effects obtainable from the present disclosure are not limited to the above-mentioned effects, and other effects not mentioned should be clearly understood from the following description by those having ordinary skill in the art to which the present disclosure pertains.

DETAILED DESCRIPTION

Figure 1:
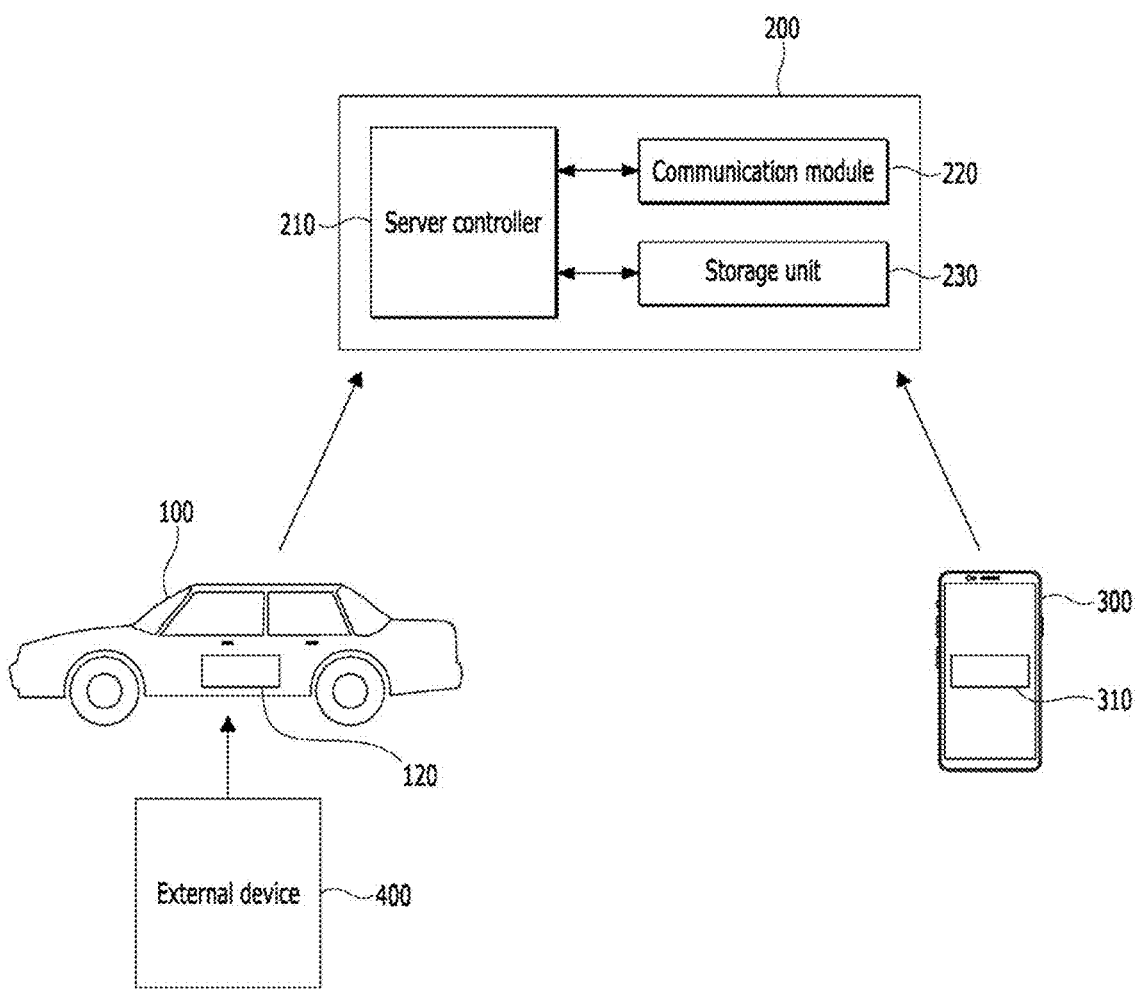
FIG. 1 is a block diagram illustrating a system for controlling a state of charge (SOC) of an electric vehicle, according to an embodiment of the present disclosure.

Hereinafter, embodiments of the present disclosure are described in detail with reference to the accompanying drawings. While the present disclosure is described in conjunction with example embodiments, it should be understood that the present description is not intended to limit the present disclosure to those embodiments of the present disclosure. The present disclosure is intended to cover not only the example embodiments, but also various alternatives, modifications, equivalents and other embodiments, which may be included within the spirit and scope of the present disclosure as defined by the appended claims.

In case where identical elements are included in various embodiments, they are given the same reference numerals, and redundant description thereof have been omitted. In the following description, the terms "module" and "unit" for referring to elements are used interchangeably in consideration of convenience of explanation, and thus, the terms per se do not necessarily have different meanings or functions.

Furthermore, in describing the example embodiments, when it is determined that a detailed description of related well-known technology may obscure the gist of the embodiments, the detailed description thereof has been omitted. The accompanying drawings are used to help easily explain various technical features and it should be understood that the embodiments presented herein are not limited by the accompanying drawings. Accordingly, the present disclosure should be construed to extend to any alterations, equivalents and substitutes in addition to those which are particularly set out in the accompanying drawings.

Although terms including ordinal numbers, such as "first", "second", etc., may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural form unless the context clearly dictates otherwise.

In the embodiments, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

Unless otherwise defined, all terms including technical and scientific ones used herein have the same meanings as those commonly understood by one of ordinary skill in the art to which the present disclosure pertains. It should be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Furthermore, the term "unit" or "control unit" included in the names of a hybrid control unit (HCU), a motor control unit (MCU), etc. is merely a widely used term for naming a controller configured for controlling a specific vehicle function, and does not mean a generic functional unit. For example, each controller may include a communication device that communicates with another controller or a sensor to control a function assigned thereto, a memory that stores an operating system, a logic command, input/output information, etc., and one or more processors that perform determination, calculation, decision, etc. necessary for controlling a function assigned thereto.

When a component, device, element, or the like of the present disclosure is described as having a purpose or performing an operation, function, or the like, the component, device, or element should be considered herein as being "configured to" meet that purpose or perform that operation or function.

According to an embodiment of the present disclosure, a predicted value for power consumption in a V2L (Vehicle to Load) mode is calculated based on general power consumption and actual power consumption of indoor/outdoor external power devices frequently used by users while built-in electronic devices (e.g., an air conditioning apparatus, a heater, or a multimedia device) are being used, and to control prediction of an estimated time until a minimum charging amount is reached based on the calculated predicted value.

FIG. 1 is a block diagram illustrating a system for controlling a status of charge of an electric vehicle, according to an embodiment of the present disclosure.

The electric vehicle (EV) 100 may include a battery 120 for driving the electric motor.

In the V2L mode where at least one external device 400 is operated by the power of the battery 120, the EV 100 analyzes the power of the battery 120 and transmits information on the amount of available power, which is the analyzed result value, to a server 200 using a wireless network or the like.

The battery 120 may be a high voltage battery. Analyzing the power of the battery 120 may include analyzing a current state of charge (SOC) of the battery 120 of the vehicle 100 when a regular mode or a utility mode is switched to the V2L mode.

The external device 400 may be referred to as an external power device or an external electronic device. The external device 400 may be electrically connected to the high-voltage battery 120 through indoor/outdoor connectors 140a and 140b (as illustrate in FIG. 2) of the electric vehicle 100, and may include various electric power devices capable of using the high-voltage battery 120. For example, the external device 400 may include an electric pad, a mini light bulb, a lantern, an induction, a mini oven, an electric pot, an electric grill, a mini refrigerator, a wine cellar, or the like.

When it is determined that the electric vehicle 100 is in the V2L mode, the electric vehicle 100 may analyze the current SOC and determine available power amount information which may include a result value of the analyzing of the SOC. The available power amount information may include an available power amount value up to the minimum charging amount based on the current SOC. The available power amount value may be referred to as the amount of available power. The minimum charging amount may be defined as a minimum power limit needed to be kept for the battery to be recharged, and may be referred to as a minimum amount of power, a minimum amount of remaining power, or a minimum amount of discharge.

The server 200 may collect the available power amount information from the electric vehicle 100 through a wireless network or the like. The server 200 may compare the collected available power amount information with specification (rated power consumption) data and analyze the information to calculate power consumption data, and store the calculated power consumption data. The server 200 may be referred to as a connected car service (CCS) server or an external server. The available power amount information may be referred to as power usage data. The rated power consumption amount on the data may be identical to the power consumption amount displayed on the external device 400. Accordingly, the rated power consumption data may be identical to the power consumption data indicated in the specification data of the device 400. A load power database (DB) may store a load power data including a plurality of rated power consumption amount values per external device, and may update a plurality of power usage data in some cases.

The server 200 may include a server controller 210, a communication module 220, and a storage unit 230.

The server controller 210 may control various programs or devices for the operation of the server 200. For example, the server controller 210 may be configured to match usage information to a preset load power data and calculate a predicted power amount for the external device 400 based on the matched usage information and the available power amount information.

The server controller 210 may be configured to predict a state of charge of the battery 120 and an estimated time to reach the minimum charging amount. The server controller 210 may convert the predicted power amount of the external device into SOC. In this case, the predicted power amount to be consumed by the external device may be a value converted into an SOC.

As described above, the server controller 210 may be configured to calculate the predicted power consumption amount per hour for the external device 400 based on power consumption amount data of general power devices. The power consumption data may be included in the load power data. In addition, the server 200 may be configured to add information or data on power usage records (e.g., time/power amount/power device name/picture, etc.) used in the electric vehicle 100 to an actual usage data as custom data under the control of the server controller 210. The power usage data or the load power data may be used to update data on a power usage record (time/power amount/power device name/picture, etc.) used by the user.

In an embodiment, the server controller 210 may calculate the predicted power consumption amount, which is the predicted power consumption amount, based on the power usage data and the rated power consumption data that are used at least once in the electric vehicle 100 and are actually measured.

In addition, the server controller 210 may analyze the predicted power amount information of the external device based on the matched usage information and the available power amount information and may predict the estimated time based on the analyzed result value.

The server controller 210 may determine a remaining time until reaching the minimum charging amount based on the estimated time. The server controller 210 may transmit the determined remaining time to a smart device 300 through the communication module 220, and may transmit a notification signal to the smart device 300 before the estimated time.

As described in more detail below, the server controller 210 may control the minimum charging amount to be reset before reaching the estimated time.

The communication module 220 may receive available power amount information from the electric vehicle 100, and may provide the available power amount information or the predicted power amount information to the smart device 300.

The communication module 220 may be referred to as a wireless communication module 220. The wireless communication module 220 may provide a wireless communication function using a wireless radio frequency. The wireless communication module 220 may include a network interface or a modem for connecting to a network (i.e., Internet, a LAN, a WAN, a telecommunication network, a cellular network, a satellite network, a POTS, or a 5G network).

The storage unit 230 may store various programs and a plurality of data necessary for the operation of the server 200. The storage unit 230 may be implemented as a non-volatile storage unit 230, a volatile storage unit 230, a flash storage unit 230, a hard disk drive (HDD), a Solid State Drive (SSD), or the like. The storage unit 230 may be accessed by the server controller 210, and thus data reading, recording, modifying, deleting, and/or updating may be performed by the server controller 210.

In addition, the storage unit 230 may separately store power usage data including the actual power consumption amount actually used in the electric vehicle 100 and the rated power consumption data. In an example, the storage unit 230 may comprise the power consumption DB including the load power data and a specification DB for storing the rated power consumption data.

The load power data may record the use of power used by the user in the electric vehicle 100 (e.g., time/power amount/power device name/picture, etc.). For example, the specification DB may store rated power consumption amounts per external device: 55 W for an electric pad, 7 W for a mini light bulb, 5 W for a lantern, 75 W for an induction heating device, 95 W for a mini oven, 30 W for an electric pot, 70 W for an electric grill, 60 W for a mini refrigerator, 30 W for a wine cellar, etc.

The server controller 210 may be configured to replace the actual power usage value of the external device with the actual power usage value based on the actually used power usage recorded or stored in the load power data.

Also, in a case where the external device is a new device that has not been used under the control of the server controller 210, the load power data may store a product specification information value of the new external device. For example, the server controller 210 may control the communication module 220 to access a homepage or a server associated with the new external device, and may receive the product specification information including the power consumption data for the new external device from the homepage or the server. The present disclosure is not limited thereto, and the server controller 210 may receive the product specification information for the new external device in various ways.

The smart device 300 may provide or receive various information or data to or from the server 200 through a wireless network. For example, the smart device 300 may receive the available power amount information from the server 200, and may provide usage information from at least one external device selected by the user to the server 200.

The smart device 300 may include a smart terminal, a smartphone, a portable terminal, a mobile phone, a portable device, or the like.

The smart device 300 may include at least one application 310. The at least one application 310 may include an application 310 related to the electric vehicle 100. The application 310 may receive and display various information on the electric vehicle 100 through the server 200, or may set a command or a default for remotely controlling the electric vehicle 100. For example, the smart device 300 may confirm the real-time current SOC of the electric vehicle 100 through the application 310 and confirm the estimated time when the electric vehicle reaches the minimum charging amount calculated based on the current SOC. However, the present disclosure is not limited thereto. For example, as described in more detail below, the smart device 300 may display power consumption/estimated time based on the usage information of the external device set by the user through the application 310.

In addition, when the information on a destination is input by the user, the smart device 300 may receive the predicted power amount information on the external device from the server 200, analyze the predicted power amount information, and set a recommended route for the destination based on the analyzed result value.

The smart device 300 may differently set the minimum charging amount according to the final destination. For example, as described in more detail below, the smart device 300 may differently set the minimum charging amount by considering a current surrounding temperature, a current traffic condition of the recommended route, and the like in real time in addition to the destination.

Figure 2:
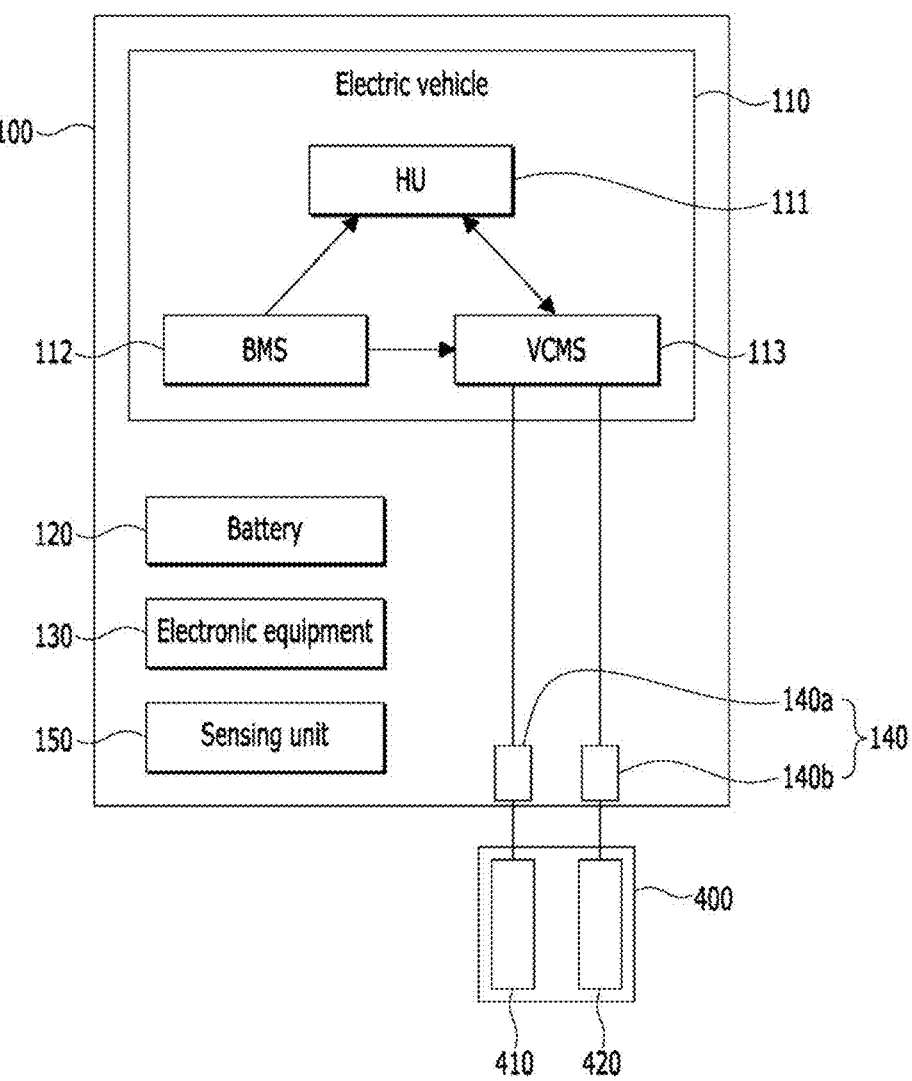
FIG. 2 is a block diagram illustrating an example configuration of an electric vehicle, according to an embodiment of the present disclosure.

FIG. 2 is a block diagram illustrating an example of an electric vehicle, according to an embodiment of the present disclosure.

Referring to FIG. 2, the electric vehicle 100 may include a battery 120, a sensing unit 150, and a controller 110.

The battery 120 may store electric energy for driving the electric vehicle 100 and supply the electric energy to an electric motor during driving. The battery 120 may comprise a high voltage battery 120.

The sensing unit 150 may include at least one temperature sensor. The at least one temperature sensor may be disposed outside the electric vehicle 100 to sense an external temperature of the electric vehicle 100 in real time and may provide the sensed external temperature to the controller 110.

The controller 110 may include a Head Unit 111, a Battery Management System (BMS) 112, and a Vehicle Charging Management System (VCMS) 113. However, the present disclosure is not limited thereto. For example, each element illustrated in FIG. 2 mainly shows elements related to the embodiments of the present disclosure, and in actual implementation, it should be apparent to those having ordinary skill in the art that the present disclosure may further include an electric motor, a controller (for example, a motor controller) for individually controlling the electric motor, and the like.

The battery management system 112 may be referred to as a battery controller. The vehicle charging management system 113 may be referred to as a general charging controller.

The Head Unit 111 may be configured to cause information about a use record of the external device 400 actually used in the electric vehicle 100 to be transmitted to the server 200.

The head unit 111 may not only provide a real-time power usage amount display, the minimum charging amount setting, and the like, but may also request a notification from the smart device 300, for example 30 minutes before the estimated time for reaching the minimum charging amount.

The Battery Management System (BMS) 112 may measure the power consumption amount of at least one built-in electrical device 130 installed in the electric vehicle 100, and may provide the information regarding the measured power consumption amount to the head unit 111. The least one built-in electric device 130 may include, for example, a multimedia, an air conditioner, an indoor mood lamp, etc.

The Battery Management System (BMS) 112 may be electrically connected to the battery 120 and may provide information about the battery 120 to the head unit 111. The information on the battery 120 may include a current charging amount of the battery 120, a state of battery capacity, a current SOC, or the like.

When the battery 120 reaches the minimum charging amount, the Battery Management System (BMS) 112 may provide or request a blocking signal for blocking transmission of power to the external device 400 to the Vehicle Charging Management System (VCMS).

In addition, the Battery Management System (BMS) 112 may estimate a duration of time required to reach the minimum charging amount based on the real-time discharge capacity (kW).

The Vehicle Charging Management System (VCMS) 113 may be electrically connected to the external device 400. The VCMS 113 may be configured to measure the usage amount or the power consumption amount of the external device 400 and provide the measured power consumption amount to the head unit 111. The VCMS 113 may control all charging-related functions of the electric vehicle 100 and controls the V2L together with an Integrated Charging Control Unit (ICCU).

In addition, the VCMS 113 may stop the V2L mode when a blocking signal is provided from the Battery Management System (BMS) 112. For example, when the blocking signal is detected, the VCMS 113 may induce or control to switch the V2L mode to a different normal mode. However, the present disclosure is not limited thereto. For example, the V2L mode may be forcibly switched to the normal mode in some cases.

The external device 400 may include a first external device 410 connected to or separated from the first connector 140*a* of the electric vehicle 100 and a second external device 420 electrically connected to or separated from the second connector 140*b* of the electric vehicle 100. The first connector 140*a* may be referred to as an indoor connector, and the second connector 140*b* may be referred to as an outdoor connector. The first external device 410 may be a power device having low power consumption which can be used in the interior of the electric vehicle 100. The second external device 420 may be a power device having high power consumption which can be used in the exterior of the electric vehicle 100. However, the present disclosure is not limited thereto.

Figure 3:
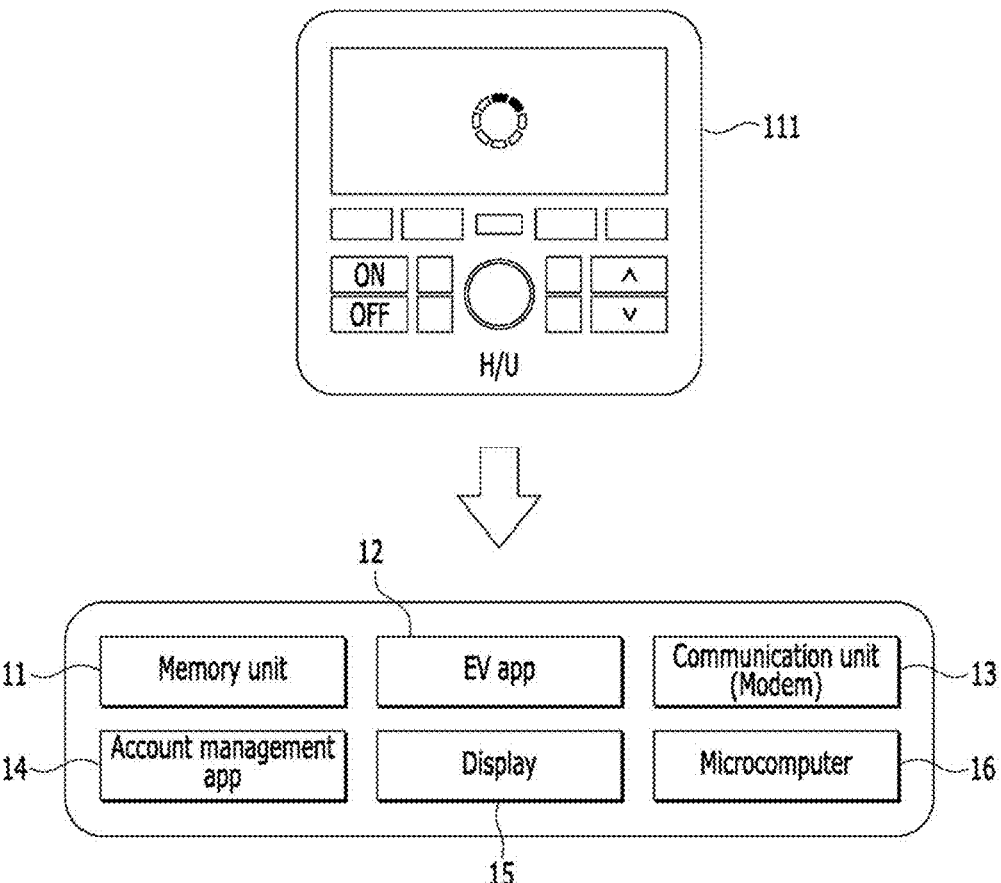
FIG. 3 is a block diagram illustrating an example head unit, according to an embodiment of the present disclosure.

FIG. 3 is a block diagram illustrating an example of a head unit, according to an embodiment of the present disclosure.

Referring to FIG. 3, the head unit 111 according to an embodiment of the present disclosure may include a memory unit 11, an EV app 12, a communication unit 13, an account management app 14, a display 15, and a microcomputer 16.

The memory unit 11 may record or store power consumption used in the electric vehicle 100. The memory unit 11 may store a used start/end time, a power amount, a connection type (e.g., indoor/outdoor/electric), or the like of all electric devices used in the electric vehicle 100.

The Electric Vehicle App (EV App) 12 may set the minimum charging amount of the battery 120. For example, the EV app 12 may set the V2L function to be stopped when the minimum charging amount being reached.

The communication unit 13 may transmit V2L usage information (power usage record) to the server 200. In the V2L mode, the communication unit 13 may provide the server 200 with information on the power amount consumption transmitted to the external device 400 and a set amount of available power information based on the power of the battery 120. The communication unit 13 may thus provide the server 200 with information on the battery 120 and information on the estimated time when the vehicle battery reaches the minimum charging amount based on the real-time charging amount.

The account management app 14 may upload the users account and the terminal information on the smart device 300 together to manage the account so that the account is linked in the server 200 or the app. For example, the account of the user may include XXX@Hyundai.com, etc.

The account management app 14 may control the head unit 11 to manage the power consumption amount of the at least one external device 400 registered by the user. For example, the account management app 14 may control the head unit 11 to internally manage a current user value. The current user value may be the power consumption amount of the at least one of the external device 400 registered by the user.

The account management app 14 may be linked with an app (or phone app) installed in the server 200 or the smart device 300 to manage the actual use value of the user as customization. The actual usage value of the user may be an actual power consumption amount of the external device 400 that has been connected to the indoor/outdoor connector of the electric vehicle 100 and has been used for a predetermined time.

The display 15 may display the EV app 12 and the account management app 14 on a screen, and may display various information related to the electric vehicle 100.

The microcomputer 16 may transmit/receive an actual CAN signal to/from the BMS/VCMS 112/113 of the electric vehicle 100. The microcomputer 16 may transmit a user change value, or the like, receive various data for the electric vehicle 100 in real time, and can transmit the various data to the EV app 12. In an example, the user change value may be a value obtained by resetting the minimum charging amount.

Figures 4A, 4B:
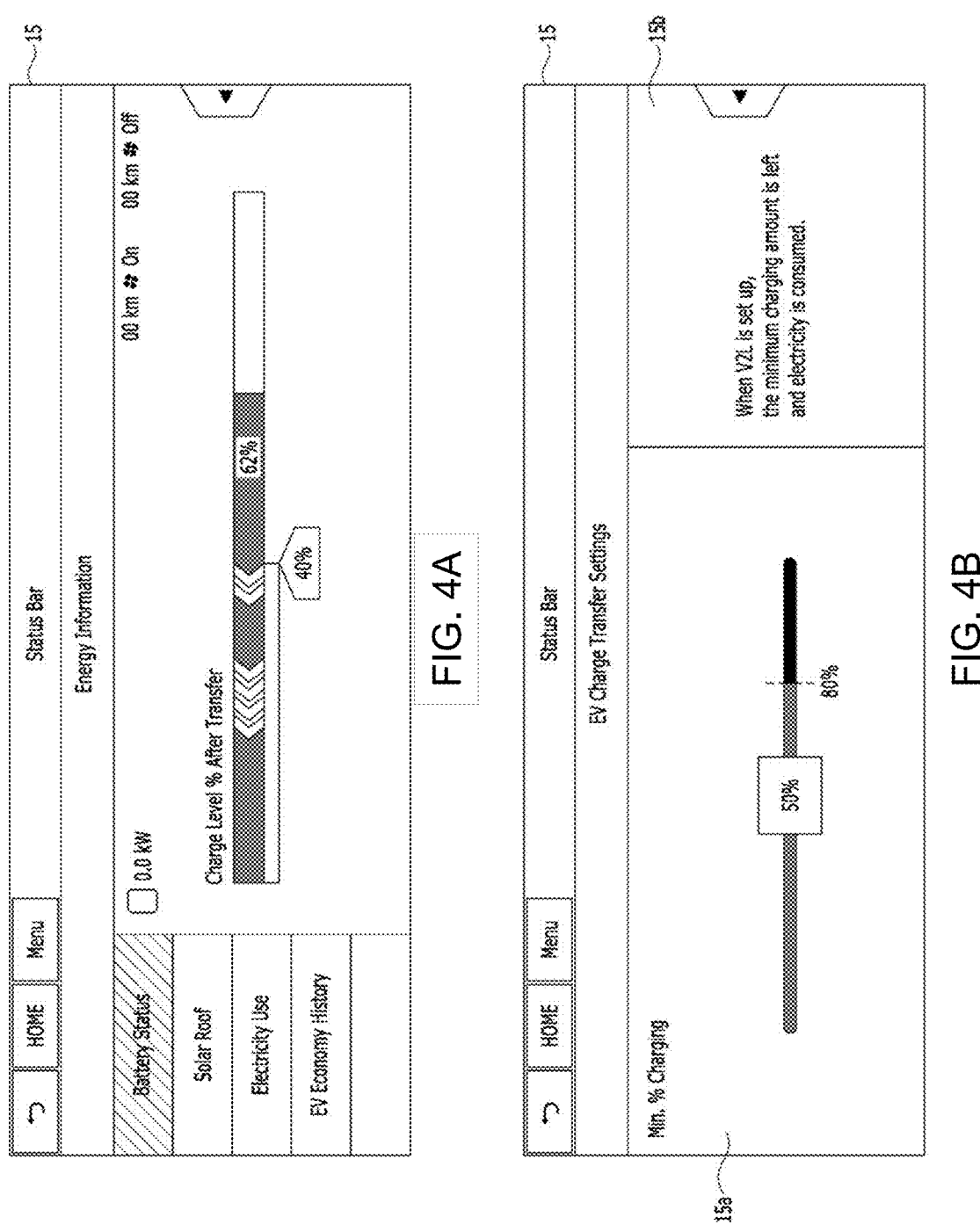
FIGS. 4A-B respectively illustrate an example screen displayed on a display of a head unit, according to an embodiment of the present disclosure.

FIGS. 4A-B respectively illustrate an example of a screen displayed on a display of a head unit. according to an embodiment of the present disclosure.

Referring to FIG. 4A, the display 15 of the head unit 111 may display energy information about the electric vehicle 100. The display 15 of the head unit 111 may display a battery state of the electric vehicle 100 in a single bar shape. For example, the display 15 of the head unit 111 may display a case of switching from the normal mode to the V2L mode in a bar shape.

Referring to FIG. 4B, when the display 15 of the head unit 111 is switched to the V2L mode, the setting for the current SOC and the minimum charging amount may be displayed in a predetermined shape or displayed in a message related thereto. For example, the predetermined shape may be a bar shape, a graph shape, or the like. For example, as illustrated in FIG. 4B, the display 15 of the head unit 111 may include a first screen 15a and a second screen 15b. The first screen

15a may display that the current SOC is set to 80% and the minimum charging amount is set to 50% through one bar shape. The second screen 15b may display a description of the current SOC according to the current mode state and the minimum charging amount. For example, the second screen 11b may display the message, "In the V2L mode, the electricity is consumed until the minimum charging amount is reached." or "XX % remains until the minimum charging amount, and Y~YY minutes remains with the current power consumption rate."

Figure 5:
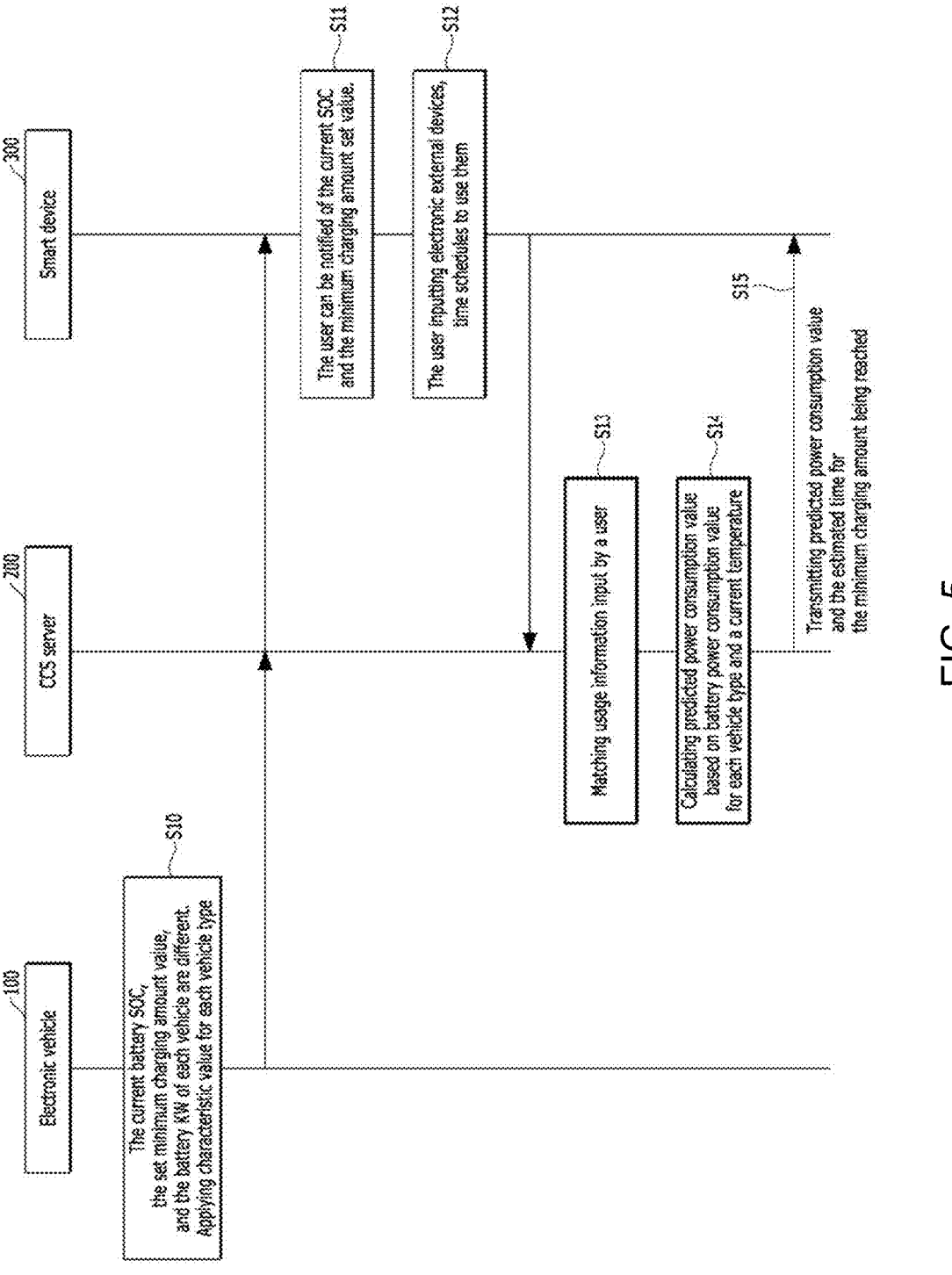
FIG. 5 is a diagram illustrating a method of controlling a state of charge (SOC) of an electric vehicle, according to an embodiment of the present disclosure.

FIG. 5 is a diagram illustrating a method of controlling a state of charge of an electric vehicle, according to an embodiment of the present disclosure.

Referring to FIG. 5, a method for controlling a state of charge of an electric vehicle according to an embodiment of the present disclosure is as follows.

In the V2L mode in which the at least one external device is driven by the power of the battery for driving the electric motor under the control of the controller of the electric vehicle 100, the available power amount information may be set based on the power of the battery.

For example, in the V2L mode according to embodiments of the present disclosure, the current battery SOC and the set minimum charging amount value may be determined under the control of the controller of the electric vehicle 100.

In an operation S10, characteristic values of different power consumption for each vehicle type of the electric vehicle 100 may be obtained under the control of the controller of the electric vehicle 100 and the minimum charging amount value may be set based on the extracted characteristic value of the power consumption. For example, the characteristic value of power consumption of the battery may be 76 kWh when the vehicle type is of the long-ranged IONIQ 5, the characteristic value of power consumption of the said battery may be 64 kWh when the vehicle type is of the standard ranged IONIQ 5, the characteristic value of power consumption of the battery may be 48 kWh when the vehicle type is of the Kona EV, the characteristic value of power consumption of the battery may be 48 kWh when the vehicle type is of the Niro EV type, the characteristic value of power consumption of the battery may be 32 kWh when the vehicle type is of the IONIQ EV, and the characteristic value of power consumption characteristic value of the battery may be 32 kWh when the vehicle type is of the Soul EV type. The above-described characteristic value of power consumption for each vehicle type is only one example and is not limited thereto.

According to an embodiment of the present disclosure, the current external temperature for the surrounding environment of the electric vehicle 100 may be sensed under the control of the controller of the electric vehicle 100, and a temperature factor may be determined by matching the sensed current external temperature with the predetermined temperature range. The temperature factor may be referred to as a temperature weight.

The SOC of the battery may minutely change the optimal performance of the battery in response to an external ambient temperature. Therefore, according to embodiments of the present disclosure, the temperature factor may be determined as different values based on the preset temperature range under the control of the controller of the electric vehicle 100. For example, when the current external temperature sensing the outside of the electric vehicle 100 is between minus (−) 10 and minus (−) 5 degrees, the temperature factor may be determined as 1.7, when the current external temperature is between minus (−) 5 and 0 degrees, the temperature factor may be determined as 1.5, when the current external temperature is between 0 and plus (+) 10 degrees, the temperature factor may be determined as 1.2, when the current external temperature is between plus (+) 10 and plus (+) 20 degrees, the temperature factor may be determined as 1.0, when the current external temperature is between plus (+) 20 and plus (+) 30 degrees, the temperature factor may be determined as 1.1, when the current external temperature is between plus (+) 30 and plus (+) 35 degrees, the temperature factor may be determined as 1.2, and when the current external temperature is between plus (+) 35 and plus (+) 40 degrees, the temperature factor may be determined as 1.3. The preset temperature range and the temperature factor are only one example, and are not limited thereto. In embodiments of the present disclosure, the different temperature factors for each of the preset temperature ranges may be determined according to the currently sensed external temperature under the control of the controller of the electric vehicle 100, and the determined temperature factors may be applied to calculate the current SOC of the battery capable of exhibiting the optimal performance of the battery.

As described above, embodiments of the present disclosure may calculate the current SOC of the battery capable of exhibiting the optimal performance of the battery by applying at least one characteristic value of the power consumption and the temperature factor to the power of the battery under the control of the controller of the electric vehicle 100, and accurately calculate the available power amount value up to the minimum charging amount of the electric vehicle based on the calculated SOC of the battery.

The available power amount information may include at least one of a SOC of the battery, an available power amount value, a characteristic value of power consumption, and a temperature weight value, or a combination thereof.

In embodiments of the present disclosure, the CCS server 200 may receive the power amount information from the said electric vehicle 100 under the control of the server controller, and may provide the received power amount information to the smart device 300.

The smart device 300 may display the available power amount information through the application of the electric vehicle 100. Accordingly, in an operation S11, the user may check the setting values of the SOC and the minimum charging amount through the smart device 300.

The smart device 300 may set usage information of at least one external device selected by the user. In an operation S12, the smart device 300 may set at least one device to be used by the selection of the user.

The usage information may include the basic information on the external device and the predicted time of use of the external device. For example, the smart device 300 may select an electric pad for camping, a mini light bulb, a mobile phone charger, and an electric pot, which are the devices to be used, through the app, and may set the predicted time of use of the external devices to be used as 1 PM to 6 PM. Further, the smart device 300 may confirm that the current SOC is 82% and the minimum charging amount is set to 20% by using the application.

In an operation S13, the CCS server 200 may receive the usage information from the smart device 300 under the control of the server controller, and match the usage information to the predetermined load power data. The load power data may include average power consumption per time of the at least one external device. The load power data may be referred to as power data of a power device.

For example, the load power data may include various power data: average power of 14 W per hour for an electric power data: average power of 14 W per hour for an electric pad for camping, average power of 7 W per hour for a small egg bulb, average power of 75 W per hour for a lantern, average power of 95 W per hour for a portable induction, average power of 30 W per hour for a mini oven, average power of 70 W per hour for an electric port, average power of 60 W per hour for a mini refrigerator, or the like.

In an operation S14, The CCS server 200 may calculate the predicted power amount for the at least one external device under the control of the server controller based on a result of the matching, e.g., the matched usage information and the available power amount information. For example, the CCS server 200 according to an embodiment may analyze the predicted power amount information of the external device based on the matched usage information and the available power amount information under the control of the server controller, and may obtain the estimated time at which the minimum charging amount can be reached based on a result of the analyzing.

Further, the CCS server 200 may predict the predicted state of charge of the battery along with the estimated time under the control of the server controller.

In an operation S15, the CCS server 200 may provide the calculated predicted power amount to the smart device 300 under the control of the server controller.

The smart device 300 may display the predicted power amount information through the app. For example, the smart device 300 may display that the predicted power consumption is 4.3 kW, the predicted battery SOC is 54%, and the minimum charging amount can be reached when the battery is used for 17 hours and 20 minutes or more using the app. Accordingly, embodiments of the present disclosure may accurately provide the user with a predicted battery consumption information in accordance with the characteristics of electronic devices to be used in the V2L mode.

In embodiments, when information on a destination is input by the user, the smart device 300 may set a plurality of traveling routes for the destination based on the predicted power amount information. The smart device 300 may apply and analyze navigation information and real-time traffic information provided from the external server to each of the plurality of traveling routes, and may set one of the plurality of traveling routes as a recommended route based on the analyzed result. The smart device 300 may adjust the predicted power amount corresponding to the recommended route or may calculate the predicted power amount again and apply the calculated predicted power amount information to the recommended route.

In an embodiment, when the recommended route is determined, the smart device 300 may calculate the power amount required until reaching the destination based on the most recently used vehicle setting mode. The vehicle setting mode may include an air conditioning mode, a specific purposed driving mode, or the like.

As described above, when the recommended route is determined, the smart device 300 may differently set the minimum charging amount according to the destination. A detailed description thereof, according to an embodiment, is provided below with reference to FIGS. 6, 7A-E and 8A-E.

Figure 6:
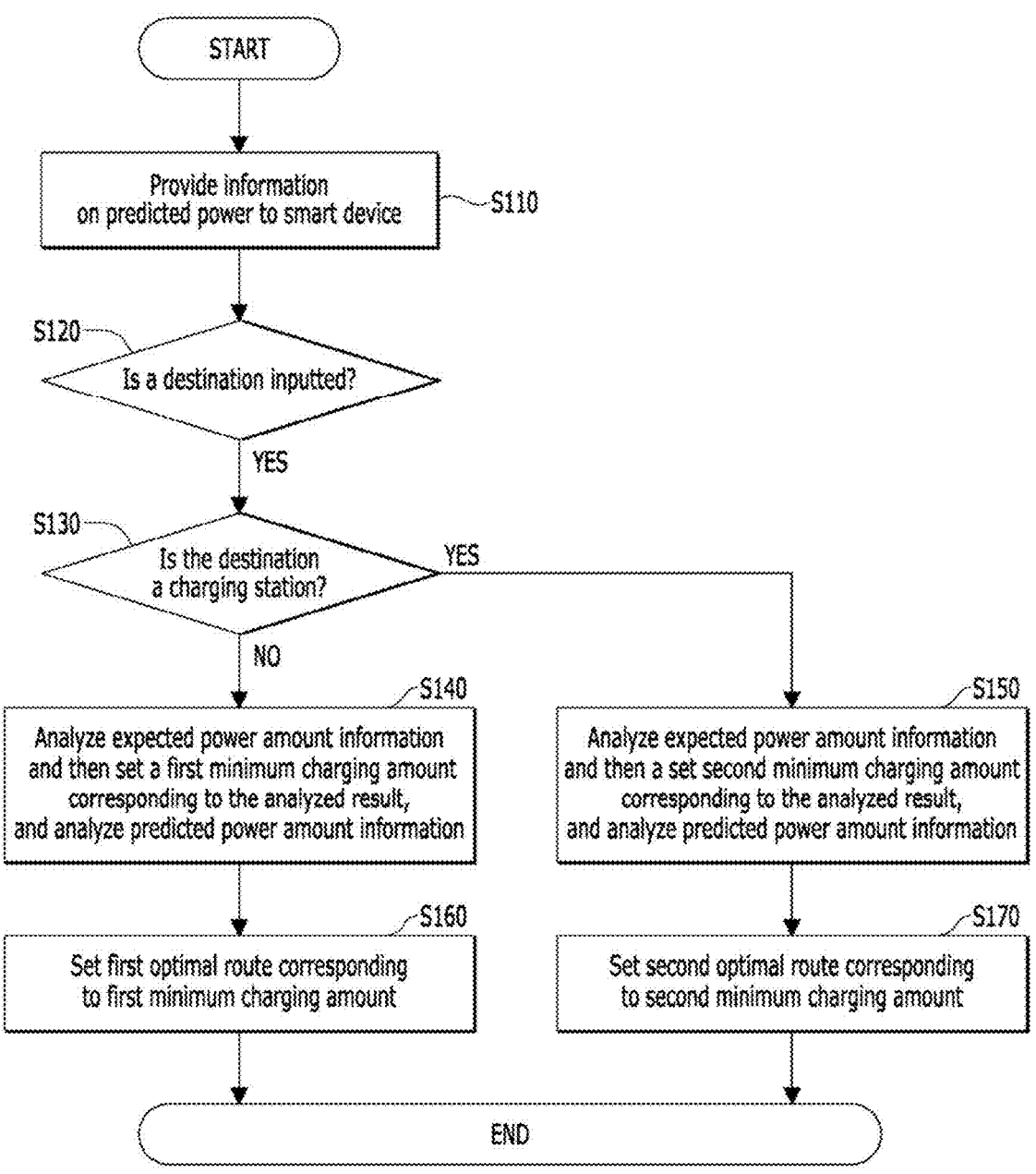
FIG. 6 is a diagram illustrating setting a minimum charging amount in correspondence to an input destination, according to an embodiment of the present disclosure.
Figure 7A:
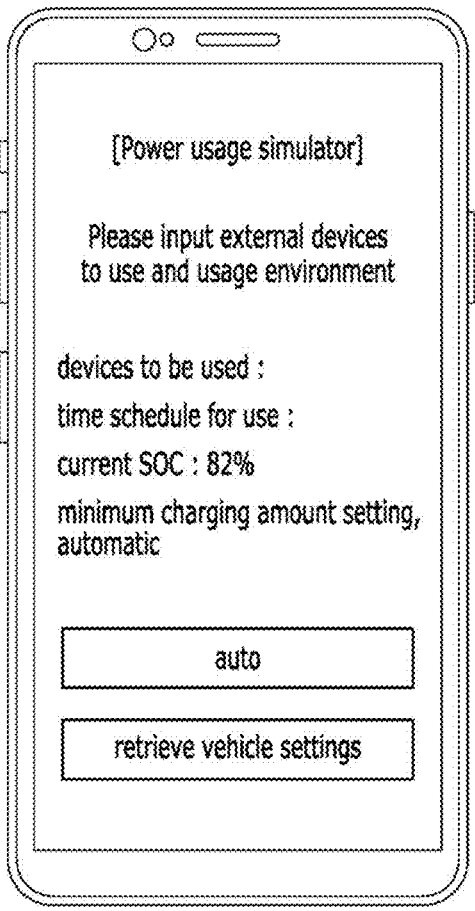
FIGS. 7A-E are screen views illustrating a case where a destination is a charging station, according to an embodiment of the present disclosure.
Figure 7B:
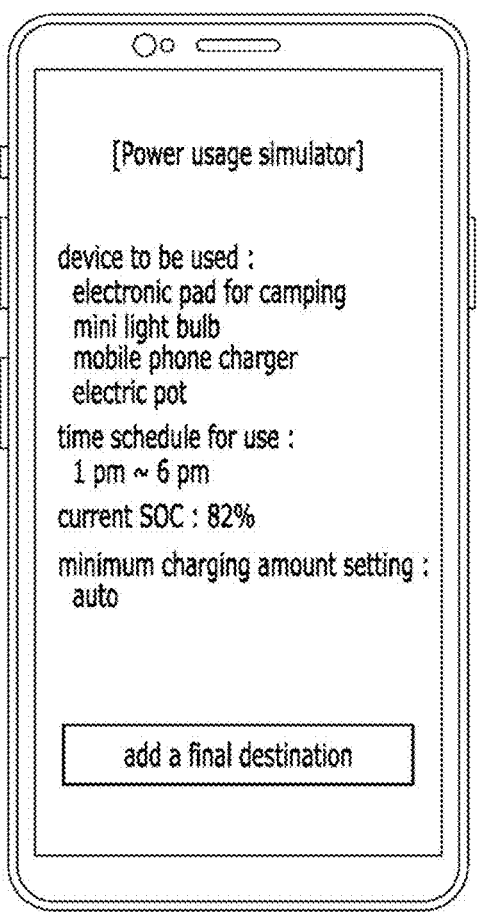
Figure 7C:
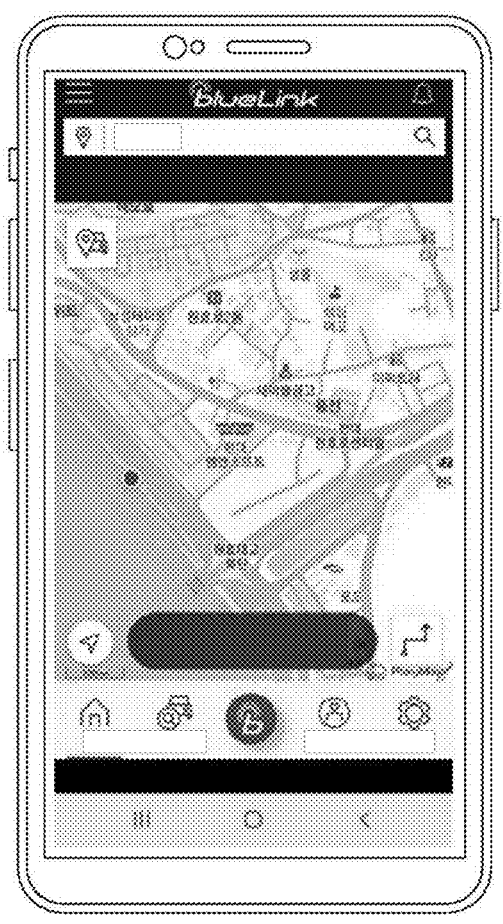
Figure 7D:
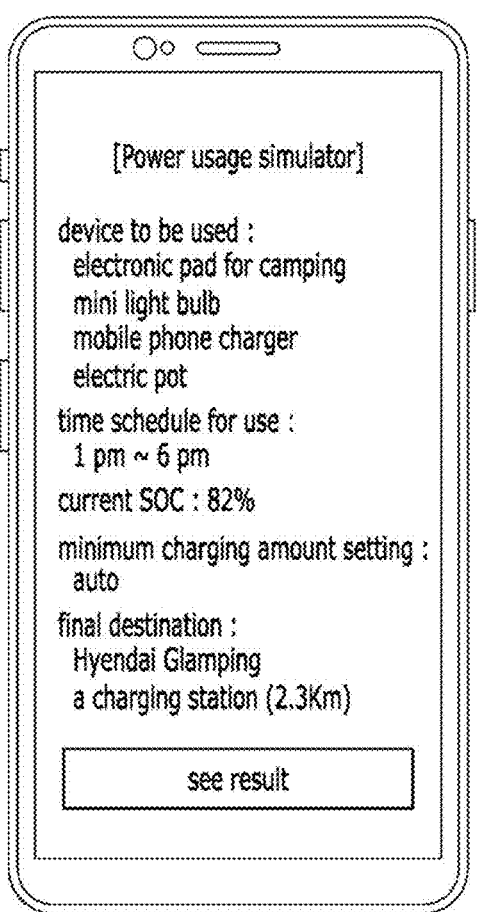
Figure 7E:
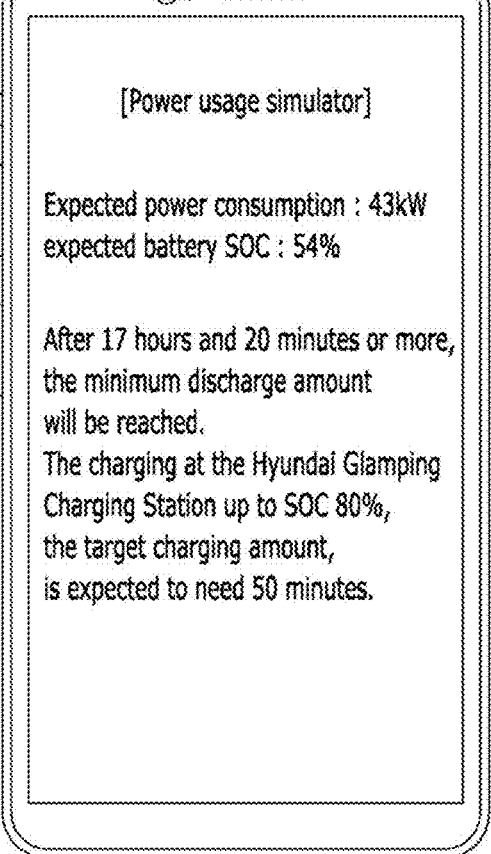
Figure 8A:
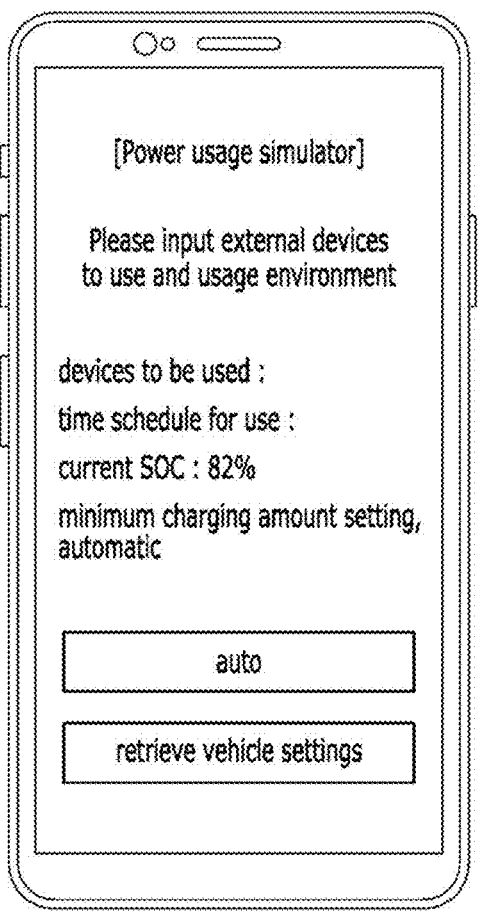
FIGS. 8A-E are screen views illustrating a case where a destination is a place other than a charging station, according to an embodiment of the present disclosure.
Figure 8B:
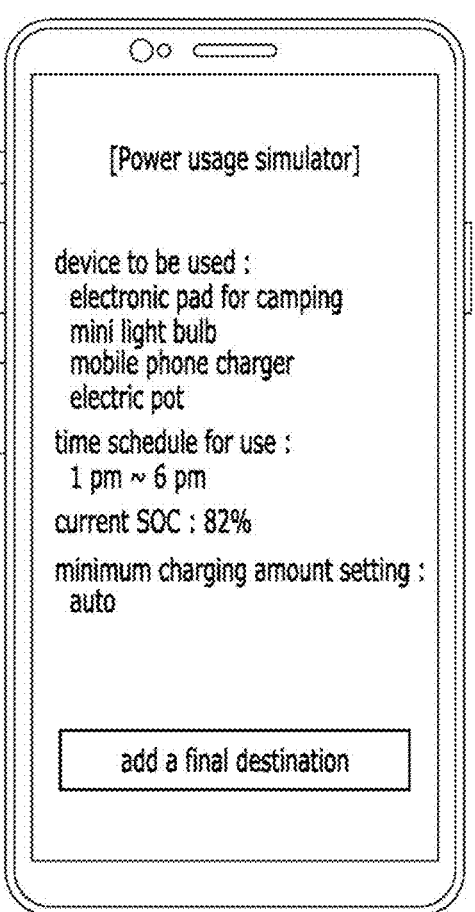
Figure 8C:
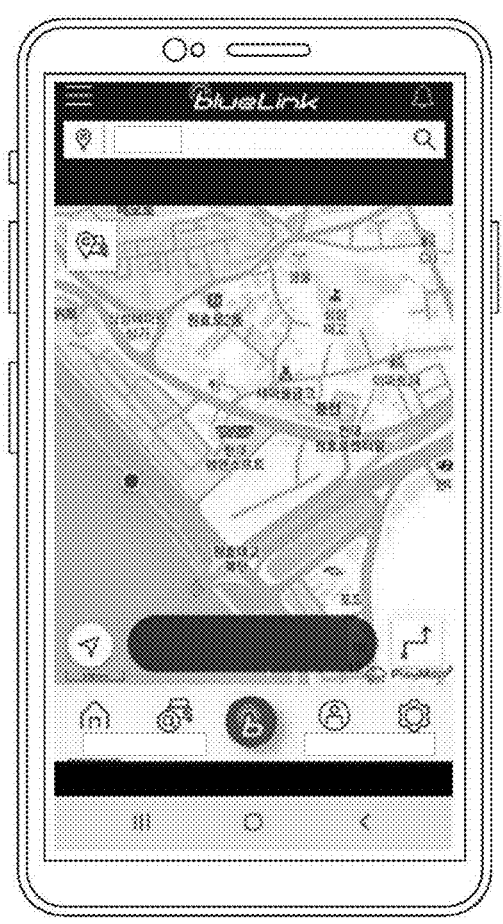
Figure 8D:
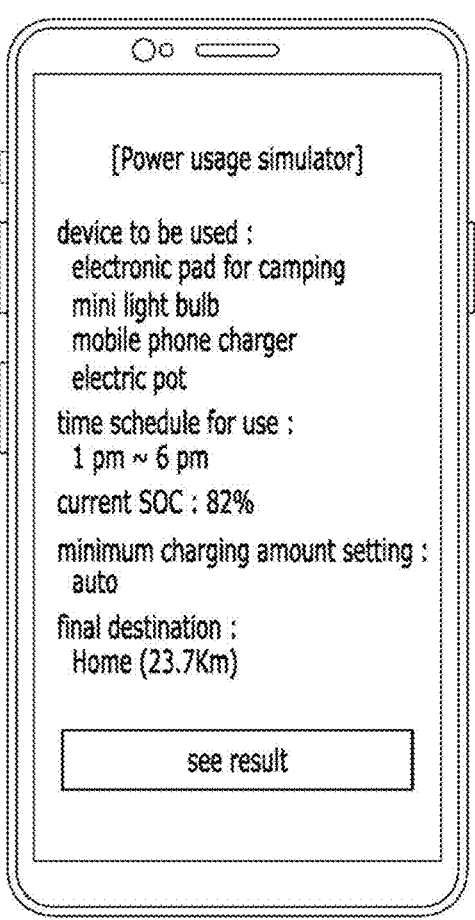
Figure 8E:
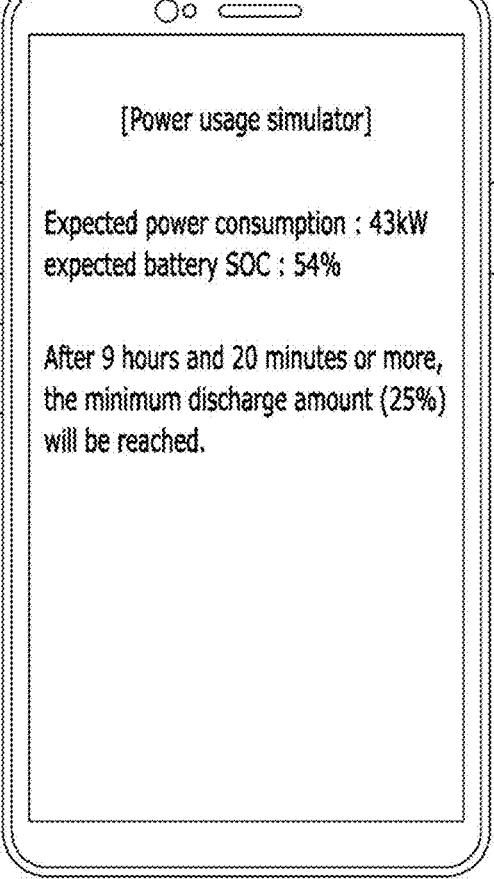

FIG. 6 is a diagram illustrating a method of setting a minimum charging amount corresponding to an input destination, according to an embodiment of the present disclosure. FIGS. 7A-E are screen views illustrating a case where the destination is a charging station, according to an embodiment of the present disclosure. FIGS. 8A-E are screen views illustrating a case where the destination is a place other than the charging station, according to an embodiment of the present disclosure.

Referring to FIGS. 6, 7A-E and 8A-E, a method of setting the minimum charging amount corresponding to the destination input according to an embodiment of the present disclosure is as follows.

As described above, the V2L mode where at least one external device is driven by the battery, according to embodiments of the present disclosure, the available power amount may be determined based on the power of the battery.

As described above, according to embodiments of the present disclosure, the smart device may receive the usage information of the at least one external device selected by the user, and may match the usage information to the predetermined load power data.

In an operation S110, as described above, the predicted power amount for the external device may be calculated based on the matched usage information and the available power amount information and provide the predicted power amount information to the smart device.

The smart device may receive the predicted power amount information from the server. The smart device may select an electric pad for camping, a mini light bulb, a mobile phone charger, and an electric pot, which are to be used, through the app, and may determine scheduled time of using the devices as 1 PM to 6 PM. Further, the smart device may confirm that the current SOC is 82% and the minimum charging amount is set to 20% by using an app. External devices to be used may be referred to as scheduled-for-use devices.

When it is determined that the information about the destination is input by the user in an operation S120, the smart device may analyze the predicted power amount information and may set a recommended route for the destination based on the analyzed result.

The smart device may set the recommended route for the destination by applying navigation information and real-time traffic information provided from the external server to the analyzed result, and guide the user to the set recommended route. For example, when analyzing the power amount required to reach the destination, the smart device may set the recommended route for the destination based on navigation route search/real-time traffic information/departure time based on the real-time data of the server, and guide the user to the set recommended route.

The smart device may differently set the minimum charging amount depending on the destination. For example, referring FIGS. 7A-E, when it is determined in an operation S130 that the destination is a charging station, the smart device may, in an operation S140, analyze the predicted power amount information and set a first minimum charging amount corresponding to the analyzed result.

In an operation S160, the smart device may set a first optimal route based on the set first minimum charging amount. That is, the smart device may calculate the power amount required to reach the charging station on the basis of the analyzed result or the most recently used vehicle setting mode (air conditioning/driving setting mode, etc.), and may predict the first minimum charging amount on the basis of the calculated power amount.

The smart device may display not only the maximum time available in the V2L mode on the basis of the predicted first minimum charging amount, but also the predicted charging time for charging at the charging station.

Further, referring to FIGS. 8A-E, when it is determined in the operation S130 that the destination is a place other than the charging station, the smart device may, in an operation S150, analyze the predicted power amount information and set the second minimum charging amount corresponding to the analyzed result.

In an operation S160, the smart device may set a second optimal route based on the set second minimum charging amount. For example, the smart device may predict the second minimum charging amount by calculating the power amount required to reach the destination (home) based on the analyzed result or the most recently used vehicle setting mode (air conditioning/driving setting mode, etc.).

The smart device may show the maximum time available in the V2L mode based on the predicted second minimum charging amount. Also, the smart device may reset the second minimum charging amount in consideration of a road traffic condition, a departure time, or the like. For example, when the second minimum charging amount is predicted to be at least 25% at the destination, the smart device may reset the second minimum charging amount to 30% in consideration of a road traffic condition, a departure time, or the like.

As described above, the smart device may set the second minimum charging amount to be greater than the first minimum charging amount. For example, when the destination is the charging station, the smart device may set the first minimum charging amount to 5%, based on this assumption, and may calculate the current SOC of the battery required for driving (2.3 km) to the charging station, which is the destination. Accordingly, the smart device may set the first minimum charging amount to about 5% in preparation for a case where the destination is a charging station but it is impossible to charge immediately upon arrival at the charging station (e.g. due to breakdown of the charging equipment, business closure, etc.) or power consumption until the destination is larger than expected due to any system-related reasons while going to the charging station.

Alternatively, when the destination is a place other than a charging station, the smart device may set the second minimum charging amount to 15% and calculate the SOC of the battery required for driving to home (23.7 km), which is the destination. Accordingly, when the destination is a place other than a charging station, the smart device may set the second minimum charging amount to approximately 15% in preparation for the case in which charging is not possible at the destination.

As described above, when the smart device predicts the required SOC of the battery, it is advantageous to determine the SOC conservatively for a destination not a charging station so that no difficulty may not be caused until the next charging. Accordingly, the smart device may set the second minimum charging amount to be greater than the first minimum charging amount.

Figure 9:
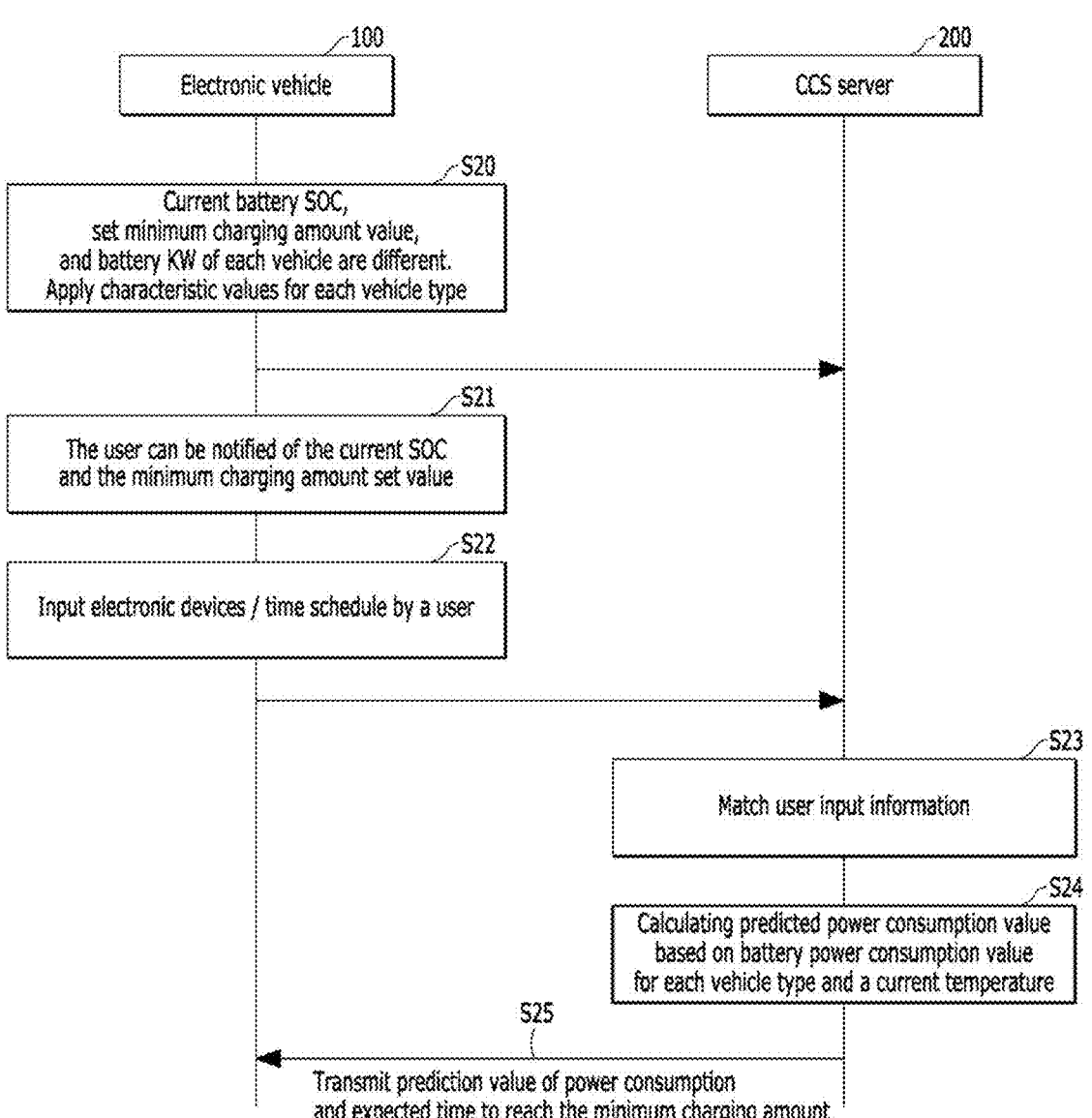
FIG. 9 is a diagram illustrating a method of controlling a state of charge (SCO) of an electric vehicle, according to another embodiment of the present disclosure.

FIG. 9 is a diagram illustrating a method of controlling a state of charge of the electric vehicle, according to another embodiment of the present disclosure.

Referring to FIG. 9, a method of controlling a state of charge of an electric vehicle according to another embodiment of the present disclosure is as follows.

According to an embodiment, when the at least one external device is driven by the power of the battery under the control of the controller of the electric vehicle 100, the available power amount may be set based on the power of the battery.

For example, according to an embodiment, when the external device is driven, the current battery SOC and the minimum charging amount may be determined under the control of the controller of the electric vehicle 100.

In an operation S20, different characteristic values of power consumption may be obtained according to the vehicle type of the electric vehicle 100 under the control of the controller 100, and the minimum charging amount value may be set based on the obtained characteristic value of power consumption. The characteristic value of power consumption for each vehicle type, according to an embodiment, is described above with reference to FIG. 5.

According to an embodiment of the present disclosure, the current external temperature for the surrounding environment of the electric vehicle may be sensed under the control of the controller of the electric vehicle 100, and the sensed current external temperature may be matched to the predetermined temperature range to extract the temperature factor.

The SOC of the battery may depend on the external ambient temperature and thus the optimal performance of the battery may slightly change accordingly. Therefore, according to an embodiment of the present disclosure, the temperature factor may be determined as different values corresponding to the preset temperature range under the control of the controller of the electric vehicle 100. The preset temperature range and the temperature factor, according to an embodiment, is described above with reference to FIG. 5.

According to an embodiment of the present disclosure, the different temperature factors for each of the preset temperature ranges may be determined according to the currently sensed external temperature under the control of the controller of the electric vehicle 100, and the determined temperature factors may be applied to calculate the current SOC of the battery capable of exerting the optimal performance of the battery.

As described above, in an embodiment of the present disclosure the current SOC of the battery capable of exerting the optimal performance of the battery may be calculated by applying at least one of the characteristic value of power consumption and the temperature factor to the power of the battery under the control of the controller of the electric vehicle 100 and accurately calculating the available power amount value up to the minimum charging amount of the electric vehicle based on the calculated SOC of the battery.

In an embodiment of the present disclosure, the CCS server 200 may receive the available power amount information from the electric vehicle 100 under the control of the server controller.

In an operation S21, the electric vehicle 100 may display the available power amount information on the display 15 of the head unit 111 under the control of the server controller. The user may thus check the current SOC and the set value of the minimum charging amount through the display 15 of the head unit 111.

In an operation S22, the electric vehicle 100 may set the use information on the at least one usage device selected by the user from the at least one external device through the head unit 111. The head unit 111 may set at least one device to be used by the user's selection.

The usage information may include the basic information on the external device and the scheduled time of use of the external device. For example, the head unit 111 may select an electric pad for camping, a mini light bulb, a mobile phone charger, and an electric pot as devices to be used through an app. For example, the head unit 111 may set the scheduled time of use of the devices as from 1 PM to 6 PM. Also, the head unit 111 may confirm that the current SOC is set to 82% and the minimum charging amount is set to 20% using the display unit 15.

In an operation S23, the CCS server 200 may receive the usage information from the electric vehicle 100 under the control of the server controller, and match the usage information to the preset load power data. The preset load power data may include the average power consumptions per time of the external devices. The load power data, according to an embodiment, is described above in connection with FIG. 5.

In an operation S24, the CCS server 200 may calculate the predicted power amount on the device under the control of the server controller based on the matched usage information and the available power amount information. For example, the CCS server 200 may analyze the expected power amount information of the external device based on the matched usage information and the available power amount information under the control of the server controller, and predict the estimated time at which the minimum charging amount can be reached based on the analyzed result.

Further, the CCS server 200 may predict the state of charge of the battery along with the estimated time under the control of the server controller.

In an operation S25, the CCS server 200 may provide the calculated predicted power amount information to the electric vehicle 100 under the control of the server controller. The electric vehicle 100 may display the predicted power amount information through the head unit 111. For example, the electric vehicle 100 using the head unit may display that the predicted power consumption is 4.3 kW, the predicted battery SOC is 54%, and the minimum charging amount may be reached when the battery is used for 17 hours and 20 minutes or longer. Accordingly, embodiments of the present disclosure can accurately provide the user with the predicted battery consumption information in accordance to the characteristics of electronic devices.

In addition, when the information on the destination is input by the user, the head unit 111 of the electric vehicle 100 may set the plurality of traveling routes for the destination based on the predicted power amount information. The head unit 111 of the electric vehicle 100 may analyze the navigation information and the real-time traffic information provided from the external server by applying the information to each of the plurality of the driving routes, and may set one of the said plurality of driving routes as the recommended route based on the analyzed result. In this case, the head unit 111 of the electric vehicle 100 may adjust the predicted power amount corresponding to the set recommended route or calculate the predicted power amount again to apply the predicted power amount to the recommended route.

In addition, when the recommended route is set, the head unit 111 of the electric vehicle 100 may calculate the power amount required until reaching the destination based on the vehicle setting mode most recently used. The vehicle setting mode may be an air conditioning mode, a certain driving mode, or the like.

The controller 110, the head unit 111, the BMS 112, and the VCMS 113 each may comprise one or more processors (e.g., computer, microprocessor, CPU, ASIC, circuitry, logic circuits, etc.) which perform the functionalities described above by executing one or more computer programs stored in one or more non-transitory computer-readable medium. Also, the processors of the head unit 111, the BMS 112, and the VCMS 113 may be separately provided or integrated in one processor.

The present disclosure described above may be implemented as computer-readable codes in a non-transitory medium in which a program is recorded. The computer-readable non-transitory medium includes various kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data, etc.

The above detailed description should not be construed as being limited in all aspects and should be considered as illustrative. The scope of the present disclosure should be determined by rational interpretation of the appended claims, and all changes within the equivalent scope of the present disclosure are included in the scope of the present disclosure.

What is claimed is:

1. A method for controlling a state of charge (SOC) of a battery of an electric vehicle, the method comprising:

setting available power amount information based on a SOC of the battery for supplying power to an electric motor for driving the electric vehicle;

receiving usage information of at least one external device selected by a user from a server or a smart device and matching the usage information to a preset load power data;

calculating predicted power amount information of the at least one external device based on a result of the matching and the available power amount information and providing the predicted power amount information; and determining a plurality of driving routes possible to a destination input by the user based on the predicted power amount information.

2. The method of claim 1, wherein determining the plurality of driving routes includes:

analyzing each of the plurality of driving routes based on navigation information and real-time traffic information provided from an external server, and determining one of the plurality of driving routes as a recommended route based on a result of the analyzing.

3. The method of claim 2, wherein setting the available power amount information includes:

determining a power consumption characteristic value for the electric vehicle, determining a current external temperature for the electric vehicle, determining a temperature factor by matching the current external temperature to a predetermined temperature range, calculating the SOC of the battery by applying at least one of the power consumption characteristic value or the temperature factor, and calculating an available power amount value based on the SOC of the battery.

4. The method of claim 3, wherein the available power amount information includes at least one of the SOC of the battery, the available power amount value, the power consumption characteristic value, or the temperature factor.

5. The method of claim 3, wherein the usage information includes basic information about the at least one external device and a predicted time of use of the at least one external device.

6. The method of claim 3, wherein calculating the SOC of the battery includes:

analyzing the predicted power amount information based on the result of the matching and the available power amount information, and predicting an estimated time to reach a minimum charging amount of the battery based on a result value of the analyzing of the predicted power amount information.

7. The method of claim 6, wherein predicting the estimated time includes predicting an estimated SOC of the battery.

8. The method of claim 7, wherein the minimum charging amount is set to be lower when the destination is a charging station.

9. The method of claim 8, wherein determining the recommended route includes predicting the minimum charging amount by calculating a power amount required to reach the destination in a most recently used vehicle setting mode.

10. The method of claim 7, wherein the matching of the usage information includes:

when the at least one external device is a new external device that has not been used, receiving information about the new external device from the server, and matching the information about the new external device to the preset load power data.

11. A system for controlling a state of charge (SOC) of a battery of an electric vehicle, the system comprising:

a non-transitory computer-readable recording medium configured to store at least one computer program for performing operations for controlling the SOC; and a processor configured to execute the computer program to perform the operations, wherein the operations for controlling the SOC include:

setting available power amount information based on an SOC of the battery for supplying power to an electric motor for driving a vehicle;

receiving usage information of at least one external device selected by a user from a server or a smart device and matching the usage information to a preset load power data;

calculating predicted power amount information of the at least one external device based on a result of the matching and the available power amount information and providing the predicted power amount information to the smart device; and determining a plurality of driving routes possible to a destination input by the user based on the predicted power amount information.

12. The system of claim 11, wherein determining the plurality of driving routes includes:

analyzing each of the plurality of driving routes based on navigation information and real-time traffic information provided from an external server, and determining one of the plurality of driving routes as a recommended route based on a result of the analyzing.

13. The system of claim 12, wherein setting the available power amount information includes:

determining a power consumption characteristic value for the electric vehicle, determining a current external temperature for the electric vehicle, determining a temperature factor by matching the current external temperature to a predetermined temperature range, calculating the SOC of the battery by applying at least one of the power consumption characteristic value or the temperature factor, and calculating an available power amount value based on the SOC of the battery.

14. The system of claim 13, wherein the available power amount information includes at least one of the SOC of the battery, the available power amount value, the power consumption characteristic value, or the temperature factor.

15. The system of claim 13, wherein the usage information includes basic information about the at least one external device and a predicted time of use of the at least one external device.

16. The system of claim 13, wherein calculating the SOC of the battery includes:

analyzing the predicted power amount information based on the result of the matching and the available power amount information, and predicting an estimated time to reach a minimum charging amount of the battery based on a result value of the analyzing of the predicted power amount information.

17. The system of claim 16, wherein predicting the estimated time includes predicting an estimated SOC of the battery.

18. The system of claim 17, wherein the minimum charging amount is set to be lower when the destination is a charging station.

19. The system of claim 18, wherein determining the recommended route includes predicting the minimum charging amount by calculating a power amount required to reach the destination in a most recently used vehicle setting mode.

20. The system of claim 17, wherein the matching of the usage information includes:

when the at least one external device is a new external device that has not been used, receiving information about the new external device from the server, and matching the information about the new external device to the preset load power data.

\* \* \* \* \*